July 4, 1933.  M. D. BOWERMAN  1,916,190
FEED MILL
Filed June 22, 1931   2 Sheets-Sheet 1
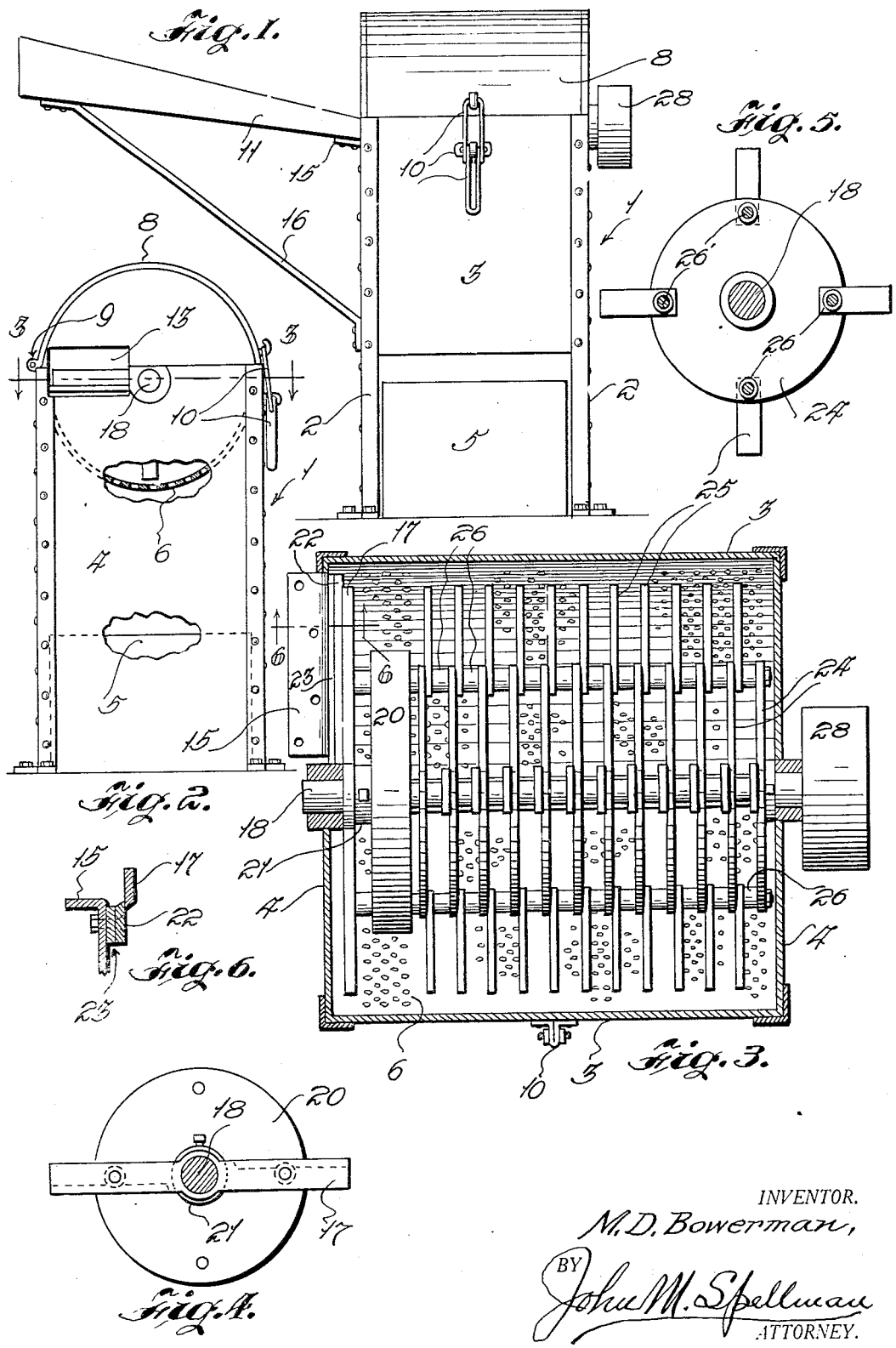
INVENTOR.
M. D. Bowerman,
BY John M. Spellman
ATTORNEY.

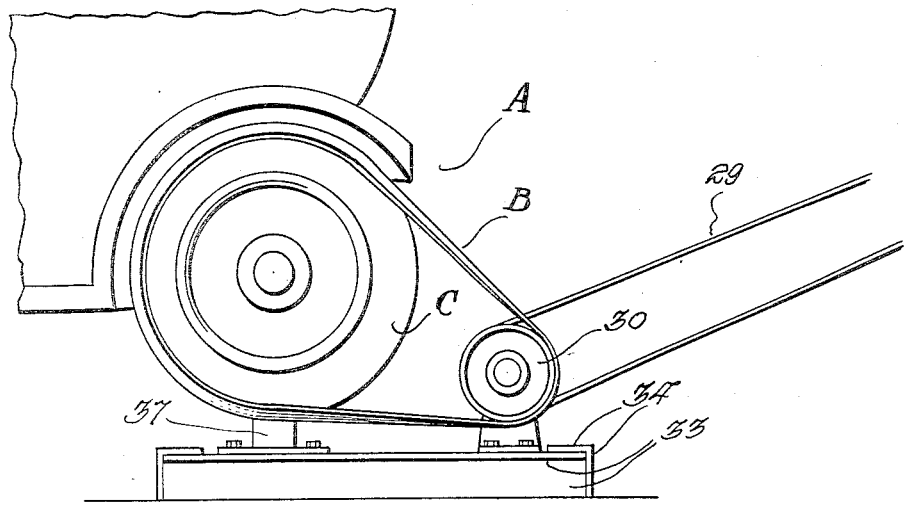
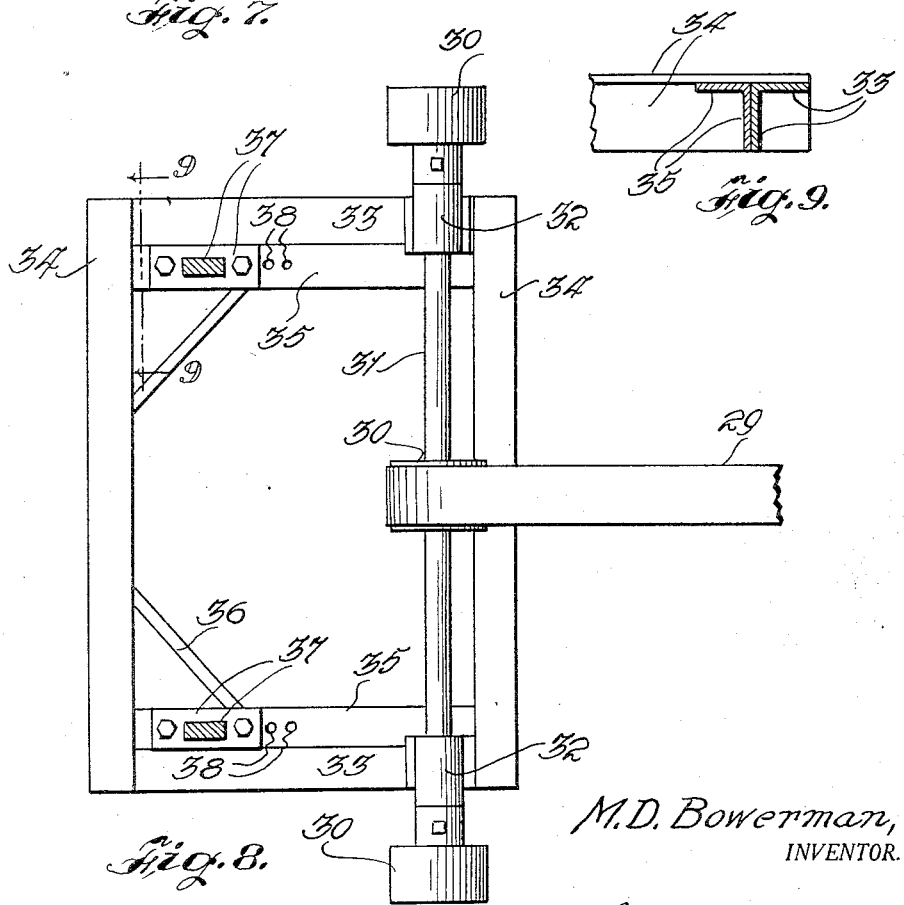

Patented July 4, 1933

1,916,190

UNITED STATES PATENT OFFICE

MARVIN D. BOWERMAN, OF CELESTE, TEXAS

FEED MILL

Application filed June 22, 1931. Serial No. 546,045.

This invention relates to mills for preparing, cutting and otherwise making fit for use feed for live stock, such as sugar cane, milo maize, corn stalks, and the like, or a combination of such of these as will produce a satisfactory live stock food.

Another of the objects of the invention resides in the means for carrying out the invention in such wise as relates to such machines or devices for individual farm use, and which machine is constructed in a simple manner as is possible, consistent with its durable and practical utility.

A further object of the invention is the means for driving the machine by a novel form of connection made possible by the use of an automobile.

With the above and other objects in view the invention will be better and more clearly understood from a perusal of the following detailed description, taken in connection with the accompanying drawings, and wherein:

Figure 1 is an elevational view of the machine embodying the mill feature thereof.

Figure 2 is a similar view, turned partly around, with the feed introducing platform or chute removed.

Figure 3 is an enlarged sectional detail view taken on the line 3—3 of Figure 2, showing the knives and hammers for cutting and breaking up the feed.

Figure 4 is an elevational view of the fly wheel and supporting shaft with the knife carried thereon.

Figure 5 is a view similar to Figure 4, but showing the same shaft which supports the fly wheel with one of the disks and the hammers carried on the disk.

Figure 6 is a detail sectional view taken on the line 6—6 of Figure 3, showing the association in cutting position of a stationary knife and revoluble knife.

Figure 7 is a side elevational view in part of an automobile, supported upon a stand with jacks and including the driving mechanism.

Figure 8 is a top plan view of the stand and driving mechanism, with the jacks in cross-section; and Figure 9 is a detail sectional view taken on the line 9—9 of Figure 8.

Referring in detail to the several views of the drawings, the mill consists of a framework 1, supported upon the legs 2 together with plates 3 and plates 4 the latter extending to the ends of the legs. The plates 3 are shortened to permit a box 5 to be slid into position for receiving the milled feed.

Spaced across and connected to the plates 3 is a screen 6 of sufficient strength and proper mesh or it may be a strong perforated and bent plate such as will permit the cut and broken feed to fall therebetween into the box 5.

A cover 8 is hingedly connected as at 9 to one of the plates 3 the opposite end of the cover having a fastening means 10 to maintain the cover in tightly closed position during the cutting and breaking operation of the feed.

An inclined platform or feed introducing chute 11 is provided for passing the feed to the knives and hammers through the opening 13. The platform or chute is connected at 15 to the plate 4 at one side and has a brace rod 16 as will be apparent from Figure 1.

The mechanism for cutting and breaking up the feed is provided for by the knife 17, connected to and revolving with a shaft 18, and mounted also on this shaft is a fly wheel 20. The knife 17 is spaced from the fly wheel by a spacer ring or member 21 and this arrangement brings knife 17 to proper cutting relation with a knife 22, fixed stationary on the part 15, and spaced therefrom by the spacer 23.

Spaced apart on the shaft 18 are a number of disks 24 and spaced around each disk are a plurality of hammers 25, the disks and hammers being held in proper spaced relation by the spacers 26, the spacers, hammers and disks being traversed by rods 26'. A pulley 28 is provided for belt connection 29 to a pulley 30.

The pulley 30 is mounted on a shaft 31, having bearings 32 bolted to a support 33, as shown in Figure 7. This support 33 is placed at each end of the platform supporting the shaft and consists of an angle iron with its horizontal portion directed outwardly. Similar supports 34 at the sides consists of angle irons with their horizontal portions directed inwardly so that the portions of opposite irons overlap. This will be apparent from Figure 7. Spaced across and between the angle irons 34 and abutting the irons 33 as shown in cross section in Figure 9 are angle irons 35, braced at 36, and bolted to the latter irons are jacks 37. Holes 38 are for adjustment purposes.

In the operation of the machine, an automobile A is moved over the jacks to proper position and the vehicle raised. The belts B are then placed on the wheels C and connected to the pulleys 30.

As the shaft 18 is thus revolved, the knives 17 and 22 are operated to cut the material fed in through the opening 13. After the material is cut the hammers 25, rotating with the shaft 18 and disks 24 hammer or beat the material and break it up to proper shape after which it falls through the screen into the box 5.

The invention should not be understood as restricted to the precise arrangement here depicted, but is capable of such changes and alterations as will be within the scope and meaning of the appended claims.

What is claimed as new is:

1. A machine of the class described comprising a framework having a container for holding material to be treated; said container having a foraminous bottom and a cover; a shaft traversing the container, said shaft having a fly wheel mounted thereon and carrying a revoluble cutting knife; a stationary cutting knife mounted within said container and near the point where material is fed into said container, said stationary cutter arranged so as to co-act with said revoluble knife; a plurality of disks mounted in spaced relation on said shaft, a plurality of beater elements mounted in spaced radial relation on said disks, a plurality of rods traversing said disks, spacer means, and beaters; a pulley mounted on said shaft outside the container for connection with a drive means and an opening in said framework for feeding the material to said knives and beaters.

2. A machine of the class described and as claimed in claim 1, said container including a chute for feeding the material into said opening of the container, means for fastening said cover in closed position and means in the framework to direct the material delivered through said foraminous bottom to a receptacle underneath.

In testimony whereof I affix my signature.

MARVIN D. BOWERMAN.